UNITED STATES PATENT OFFICE.

JAMES W. TERMAN, OF NEW SHARON, IOWA, ASSIGNOR OF ONE-HALF TO D. CHAMPLAIN, OF COLFAX, IOWA.

COMPOUND FOR PURIFYING BUTTER.

SPECIFICATION forming part of Letters Patent No. 559,634, dated May 5, 1896.

Application filed September 28, 1895. Serial No. 563,962. (No specimens.)

*To all whom it may concern:*

Be it known that I, JAMES W. TERMAN, a citizen of the United States of America, residing at New Sharon, in the county of Mahaska and State of Iowa, have invented a new and useful Composition of Matter to be Used for Purifying and Preserving Butter and Milk, of which the following is a specification.

My object is to provide in suitable quantities and in suitable sealed packages a manufacture adapted to be handled advantageously as merchandise to be used in the manner hereinafter set forth.

My composition consists of the following ingredients, combined in the proportions stated, viz: boracic acid, one (1) pound; sorghum-sugar, one-fourth ($\frac{1}{4}$) pound; burnt alum, one-fourth ($\frac{1}{4}$) pound; saltpeter, one-eighth ($\frac{1}{8}$) pound; pea-flour, three (3) ounces. These ingredients are to be thoroughly mingled by agitation.

In using the above-named composition to purify and preserve ten (10) pounds of fresh butter I place it in a non-corrosive vessel and then place the vessel in another water-tight vessel of corresponding shape, but of larger diameter, so that water can be filled in between the two vessels, and then place the vessels on a stove and boil the water sufficiently to bring the butter in the inner vessel to eighty (80) or ninety (90) degrees of heat. Then remove it from the fire and add one-half ($\frac{1}{2}$) ounce of the composition and stir it in the butter that has been thus sterilized and made an emulsion. After standing five or ten minutes, skim off all foreign matter that rises to the top and then pour the butter into a suitable vessel, and when cold it will be ready for use. If it is to be kept for future use, it should be hermetically sealed while hot. The antiseptic substances in the composition are thus utilized in destroying the life of all micro-organisms that may exist in the matter treated and the pea-flour in the composition will be liberated by the heat, and, being of less specific gravity than butter and milk, will rise to the top and carry therewith dead microbes and other foreign matter, so that such impurities that gather and adhere to the flour will be readily skimmed off from the top of the substance treated and purified. It is therefore obvious that the pea-flour or its equivalent is an active and essential ingredient in accomplishing the purposes contemplated by my invention.

Stale or rancid butter should be treated in the same way, but to ten (10) pounds of butter one (1) ounce or more of the composition (according to the condition of the butter) should be added and the butter heated to one hundred (100) degrees or more.

Columbia or other suitable coloring-matter and salt may be added to the butter in such quantities as desired at the same time the composition is stirred in.

To purify and preserve sweet milk, treat it in the same manner as fresh butter and add my composition in about the same proportions given for fresh butter.

Bacteria or other micro-organisms that may exist in butter and milk are thus certainly destroyed and the pure sterilized food used without danger of causing disease in those who partake thereof.

What I claim as new, and desire to secure by Letters Patent of the United States therefor, is—

The herein-described composition of matter to be used for purifying butter and milk, consisting of boracic acid, sorghum-sugar, burnt alum, saltpeter and pea-flour, in about the proportions specified.

JAMES W. TERMAN.

Witnesses:
JOHN W. CARR,
H. H. HAMMOND.